United States Patent [19]
Rohee et al.

[11] Patent Number: 5,692,839
[45] Date of Patent: Dec. 2, 1997

[54] VEHICLE SEAT SLIDE

[75] Inventors: René Rohee, La Chapelle Biche; François Baloche, Flers, both of France

[73] Assignee: Bertrand Faure Equipements SA, France

[21] Appl. No.: 741,770

[22] Filed: Nov. 5, 1996

[30] Foreign Application Priority Data

Nov. 14, 1995 [FR] France .................... 95 13472

[51] Int. Cl.$^6$ ........................................... F16C 29/04
[52] U.S. Cl. ............................................... 384/47
[58] Field of Search ........................ 384/47, 49, 34, 384/17, 18, 19

[56] References Cited

U.S. PATENT DOCUMENTS

| | | | |
|---|---|---|---|
| 3,759,587 | 9/1973 | Christin | 384/47 |
| 4,787,756 | 11/1988 | Pilarski. | |
| 5,370,350 | 12/1994 | Okano et al. | 384/47 |
| 5,522,665 | 6/1996 | Baloche et al. | |
| 5,529,397 | 6/1996 | Yoshida | 384/47 |

FOREIGN PATENT DOCUMENTS

| | | |
|---|---|---|
| 0 076 041 | 4/1983 | European Pat. Off. . |
| 0 673 799 | 9/1995 | European Pat. Off. . |
| 1530540 | 11/1968 | France . |
| 669664 | 4/1952 | United Kingdom . |
| 1 573 896 | 8/1980 | United Kingdom . |

*Primary Examiner*—Lenard A. Footland
*Attorney, Agent, or Firm*—Larson and Taylor

[57] ABSTRACT

A slide for a vehicle seat comprises a first bar having a narrow channel section with vertical flanges that are extended outwardly by rims, and a second bar having a wide upside-down channel section enveloping the first bar with the ends of the vertical flanges being extended inwardly by reentrant troughs, the two bars being shaped to form four ball tracks between them. Each outer vertical flange has an outwardly directed ridge, and each rim has an extension suitable for hooking against the inside face of a ridge when a vertical force is exerted tending to pull the two bars apart.

3 Claims, 1 Drawing Sheet

VEHICLE SEAT SLIDE

FIELD OF THE INVENTION

The invention relates to vehicle seat slides, i.e. devices that are interposed between the floor of a vehicle and the seats thereof in order to make it possible to adjust the longitudinal position of such seats.

BACKGROUND OF THE INVENTION

More particularly, amongst such slides, the invention relates to slides comprising: a first bar, a second bar engaged with clearance in the first bar so as to form four longitudinal "ball tracks" between the two bars, and groups of balls housed in said tracks so as to constitute ball bearings for mutual longitudinal sliding between the two bars, the first bar having a narrow, generally channel-shaped right section comprising both a horizontal flat web and two flanges each extending vertically from the web to a respective end edge that is extended outwardly by a respective rim, and the second bar having a wide, generally channel-shaped right section comprising both a flat horizontal web adjacent to the end edges of the flanges of the first bar and two flanges enveloping the first bar, each flange extending away from the web of the second bar substantially vertically and in the opposite direction to the two flanges of the first bar to respective end edges that are inwardly extended by respective reentrant troughs each presenting in succession a substantially horizontal length followed by a substantially vertical length extending adjacent to a corresponding vertical flange of the first bar towards the end edge thereof, each rim being interposed between two ball tracks, namely a first ball track disposed between said flat and an inside corner zone of the second bar situated between the web and a flange of said second bar, and a second ball track disposed between the rim and the corresponding trough.

Such slides with four ball tracks are advantageous in that they make it possible to achieve very easy longitudinal seat sliding, i.e. sliding via ball bearings, even when the seats are subjected to a degree of lifting, as happens to the front seats of motor vehicles when they are pushed rapidly forwards by thrust exerted on the seat back while it is itself folded down forwards more or less onto the seat proper.

It is also essential for the slides in question to oppose very high resistance to vertical forces tending to pull their two component bars apart, forces which may be applied to said slides, for example in the event of an accident, in particular when the seat in question is of the type having a seat belt anchored thereto, i.e. where the belt holding the passenger to the seat has an anchor point located at the top of the seat back.

In embodiments that have been proposed for four-ball-track slides of the kind described above, the rims which extend the flanges of the narrow bar outwardly are relatively short and substantially flat, and their edges remain under all circumstances at a distance from the vertical flanges of the wider bar that covers them (see U.S. Pat. No. 4,787,756).

As a result, when a very large force is tending to pull the two bars apart in a vertical direction, the troughs may tend to open out and the rims to fold up and then escape from the now-deformed inside edges of the troughs.

OBJECTS AND SUMMARY OF THE INVENTION

An object of the invention, amongst others, is to remedy the above drawback, by providing stronger mutual connection between the two bars in the vertical direction.

To this end, according to the invention, in slides of the kind in question each of the two flanges of the second bar has an outwardly-projecting ridge, each ridge having a "reentrant" inside face oriented towards the end edge of the same flange, and each rim of the first bar includes an extension likewise projecting outwards and normally extending adjacent to the reentrant inside face of the corresponding ridge so as to leave a small intermediate clearance gap.

As a result, when strong forces seek to move the two bars vertically apart, the edge of said rim is pressed continuously against said inside face with a hooking effect which then makes it impossible for the rim to unfold and thus escape from the trough.

In the preferred embodiments, use is also made of one or more of the following dispositions:

- the extension of each rim comprises in succession a substantially vertical flat extending towards the end edge of the corresponding flange of the second bar, and then an oblique terminal flat sloping outwards and towards the end edge of the corresponding flange of the second bar, said oblique terminal flat defining the corresponding second ball track and bearing against the balls concerned; and
- each ridge provided in a flange of the second bar has an inwardly-open V-shaped profile.

Apart from the above main dispositions, the invention includes certain other dispositions which are preferably used simultaneously therewith and which are described in greater detail below.

BRIEF DESCRIPTION OF THE DRAWING

A preferred embodiment of the invention is described below with reference to the accompanying drawing, naturally in non-limiting manner.

MORE DETAILED DESCRIPTION

To clarify the description, the terminology used below refers to certain components having positions that are relatively high or low, top or bottom, that are U-shaped, or in the shape of an upside-down U, etc., however it should be understood that these references are used merely for illustrative purposes and the references in question could be all the other way up without going beyond the ambit of the invention since the slides in question can be used equally well either way up.

Figure 1:
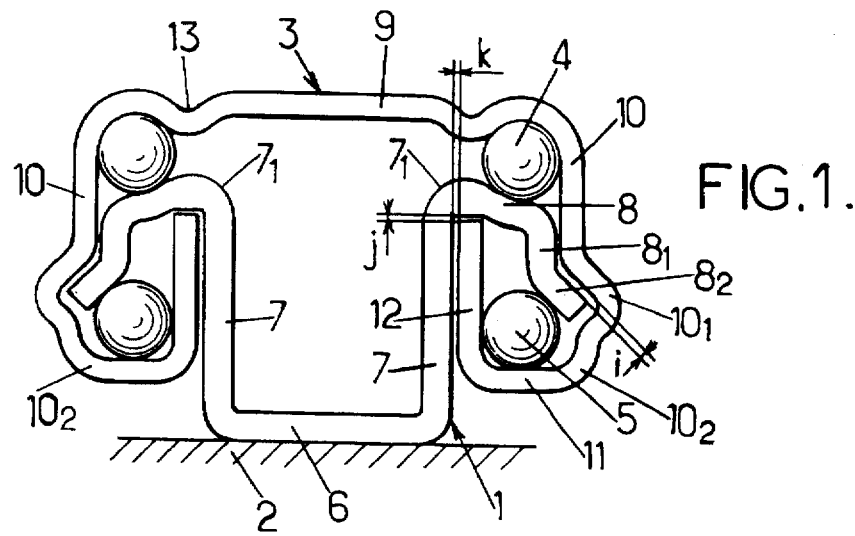
FIG. 1 of the drawing is an end view of a vehicle seat slide made in accordance with the invention and shown in its normal state.

The slide shown in FIG. 1 comprises:
- a fixed bottom bar 1 designed to be fixed to the floor 2 of a vehicle;
- a moving top bar 3 designed to be fixed to the seat of the vehicle (not shown) and engaged with clearance in the fixed bar; and
- a plurality of balls 4, 5 interposed between the two bars to act as ball bearings for longitudinal relative sliding of the bars.

Each of the two bars 1 and 3 is constituted by sheet metal folded by any desirable means (stamping, extrusion, . . .) and having the same profile or right section along its entire length.

The fixed bar 1 is a generally narrow channel section bar having a flat web 6 and vertical flanges 7 that are extended outwardly by rims 8 sloping gently downwards.

The moving bar is a generally wide channel section bar having a substantially flat web 9 and substantially vertical flanges 10 enveloping the first bar 1, with the bottom edge of each of its flanges 10 being extended inwardly by a reentrant trough which presents in succession a substantially horizontal length 11 followed by a substantially vertical length 12 extending upwards adjacent to a vertical flange 7 of the fixed bar.

Grooves 13 are provided in the side zones of the top face of the web 9 so as to produce ribs that project from the inside face thereof.

Also:
- each of the flanges 10 of the wider bar 3 has an outwardly-projecting ridge $10_1$ in the bottom half of its extent that preferably has a V-shaped right section; and
- each rim 8 is itself extended by a first flat $8_1$ extending vertically downwards and by an oblique terminal flat $8_2$ extending downwards and outwards.

The profiles or right sections of the two section bars 1 and 3 are designed so as to form four ball tracks between them: the first two tracks, on top and corresponding to the balls 4, are disposed between the top faces of the rims 8 and the inside corner zones of the second bar 3, which zones are defined horizontally by the flanges 10 and the ribs 13, while the other two tracks, underneath and corresponding to the balls 5, are disposed between the troughs 11, 12 and the bottom faces of the flats $8_2$ terminating the rims 8.

When the slide is in its normal state, the set of two flats $8_1$ and $8_2$ extends along the inside top portion of the ridge $10_1$ leaving a small clearance gap i (see FIG. 1).

In said normal state, the top end of the vertical length 12 of each trough is a small clearance gap j from the facing face of the rim 8 that passes over said end, and said length 12 is itself at a small horizontal clearance gap k from a vertical flange 7 of the first bar 1.

It can be seen that under such conditions longitudinal sliding of the moving bar 3 relative to the fixed bar 1 can take place quite freely with the balls 4 and 5 rolling and all loads on the moving bar being transmitted to the fixed bar via said balls without there being any local contact between the two bars concerned.

Figure 2:
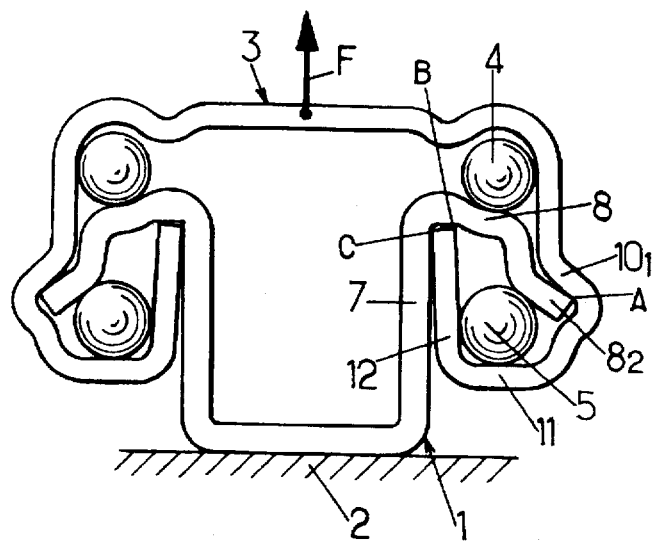
FIG. 2 is a similar view of the same slide in the state it occupies when a separation force is exerted between the two bars.

If under such conditions a vertical upward force F is exerted on the moving top bar 3 (FIG. 2), then the following consequences are observed:
- the force F in question gives rise to upwardly directed vertical thrust of the troughs 11, 12 against the balls 5, thereby pushing said balls upwards and thus also pushing up the flats $8_2$ which are consequently pressed against the ridges $10_1$ along lines of contact A, eliminating the clearance gaps i; and
- the top edges of the vertical lengths 12 of the troughs also come into contact with the overlying roots of the rims 8 along lines of contact B, eliminating the clearance gaps j.

Once the clearance gaps i and j have been eliminated, then the force F exerted on the top bar 3 is transmitted in full to the bottom bar 1 along linear contact zones A and B.

The hooking effect that results from contact established at A between the ridges $10_1$ of the moving bar 3 and the ends of the oblique flats $8_2$ of the fixed bar 1 is extremely strong since it prevents the flat 8 from unfolding in a way that would enable it to escape from the trough 11, 12.

It should also be observed that the effect of pressing each oblique flat $8_2$ against a ball 5 is to urge the ball towards the inside of the slide, pressing the corresponding length 12 horizontally against the adjacent vertical flange 7, thereby eliminating the clearance gap k.

In other words, the length 12 is pressed horizontally at C against the vertical flange 7 to which it is horizontally adjacent, thereby preventing the trough 11, 12 from opening: that constitutes an additional source of resistance to the two bars 1 and 3 being pulled apart.

In fact, the resistance in question is excellent.

It should be observed that the structure proposed above for the slide lends itself to the slide being mounted in any orientation.

Figure 3:
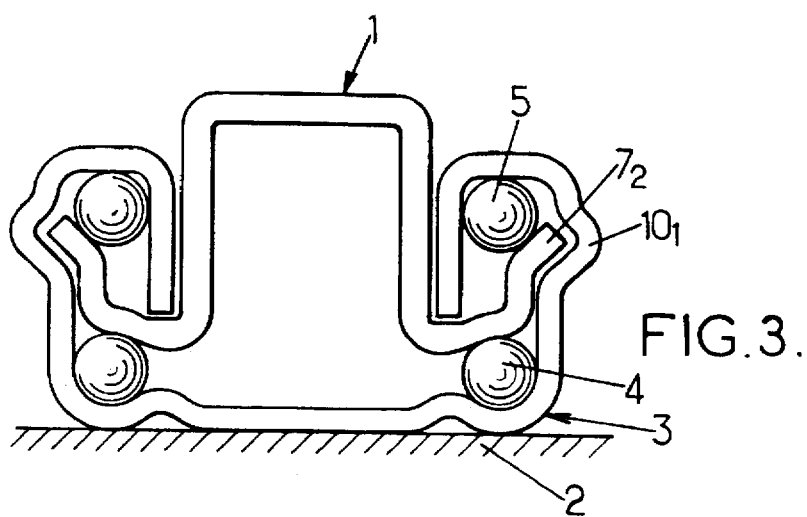
FIG. 3 is another similar view of the same slide, but shown upside-down relative to FIG. 1.

FIG. 3 shows the slide upside-down relative to FIG. 1, with the wider bar 3 becoming the fixed bottom bar which is fixed to the floor 2 of the vehicle, while, on the contrary, the narrower bar 1 becomes the moving top bar fixed to the seat.

In this case as in the preceding case, the above-indicated advantages can be observed both concerning the great ease with which the two bars can slide mutually in a longitudinal direction on simple ball bearings, and the excellent resistance of the said bars to being pulled apart vertically when an upwards vertical force is exerted on the moving bar 1, the outer oblique flat $8_2$ which extends each rim 8 of the narrow bar then hooking in this case also against the facing ridge $10_1$ of the flange 10 of the wide bar.

It would also be possible to mount the slide in question on a sloping portion of floor or even on a vertical wall, the web 6 of the narrower bar 1 or the web 9 of the wider bar 3 then extending vertically: even when the slide is oriented in such a manner the above-described ball bearing and hooking qualities are retained.

We claim:

1. A vehicle seat slide, comprising a first bar, a second bar engaged with clearance in the first bar so as to form four longitudinal "ball tracks" between the two bars, and groups of balls housed in said tracks so as to constitute ball bearings for mutual longitudinal sliding between the two bars, the first bar having a narrow, generally channel-shaped right section comprising both a horizontal flat web and two flanges each extending vertically from the web to a respective end edge that is extended outwardly by a respective rim, and the second bar having a wide, generally channel-shaped right section comprising both a flat horizontal web adjacent to the end edges of the flanges of the first bar and two flanges enveloping the first bar, each flange extending away from the web of the second bar substantially vertically and in the opposite direction to the two flanges of the first bar to respective end edges that are inwardly extended by respective reentrant troughs each presenting in succession a substantially horizontal length followed by a substantially vertical length extending adjacent to a corresponding vertical flange of the first bar towards the end edge thereof, each rim being interposed between two ball tracks, namely a first ball track disposed between said flat and an inside corner zone of the second bar situated between the web and a flange of said second bar, and a second ball track disposed between the rim and the corresponding trough, wherein each of the two flanges of the second bar has an outwardly-projecting ridge, each ridge having a "reentrant" inside face oriented towards the end edge of the same flange, and wherein each rim of the first bar includes an extension likewise projecting outwards and normally extending adjacent to the reentrant inside face of the corresponding ridge so as to leave a small intermediate clearance gap.

2. A slide according to claim 1, wherein the extension of each rim comprises in succession a substantially vertical flat extending towards the end edge of the corresponding flange of the second bar, and then an oblique terminal flat sloping outwards and towards the end edge of the corresponding flange of the second bar, said oblique terminal flat defining the corresponding second ball track and bearing against the balls concerned.

3. A slide according to one of claim 1, in which each ridge provided in a flange of the second bar has an inwardly-open V-shaped profile.

* * * * *